United States Patent [19]

Umeda

[11] Patent Number: 5,737,107
[45] Date of Patent: Apr. 7, 1998

[54] INFORMATION TRANSMITTING APPARATUS

[75] Inventor: Yuichi Umeda, Fukushima-ken, Japan

[73] Assignee: Alps Electric Co., Ltd., Tokyo, Japan

[21] Appl. No.: 633,987

[22] Filed: Apr. 17, 1996

[30] Foreign Application Priority Data

Apr. 21, 1995 [JP] Japan ................... 7-096894

[51] Int. Cl.$^6$ .................................................. H04B 10/00
[52] U.S. Cl. .................... 359/146; 359/142; 359/143; 340/825.52; 340/82.72
[58] Field of Search ..................... 359/142, 143, 359/144, 145, 146, 147, 148, 172, 152, 165, 137; 340/825.52, 825.69, 825.72; 370/428, 465, 466, 475, 471, 470

[56] References Cited

U.S. PATENT DOCUMENTS

| 4,930,011 | 5/1990 | Kiewit | 359/143 |
| 5,250,942 | 10/1993 | Nakayama | 340/825.52 |
| 5,309,351 | 5/1994 | McCain et al. | 359/144 |
| 5,321,542 | 6/1994 | Freitas et al. | 359/172 |

Primary Examiner—Rafael Bacares
Attorney, Agent, or Firm—Guy W. Shoup

[57] ABSTRACT

An information transmitting apparatus for efficiently transmitting input information coming from a plurality of transmitters wherein a receiver can determine the type of the transmitter from which the information was sent, the apparatus being produced at low cost and matching the conventional counterpart in signal reach distance. This information transmitting apparatus comprising a plurality of transmitters for sending input information in wireless manner, a receiver for receiving the input information coming from the plurality of transmitters to process the received input information, and a host controller connected to the receiver for accepting the processed information from the receiver, wherein the plurality of transmitters selectively send first-format information containing no device identifier and second-format information containing a device identifier and the receiver determines a type of one of the transmitters that has sent the input information from the device identifier contained in the received second-format information to perform information processing according to the determined type of the transmitter.

5 Claims, 5 Drawing Sheets (STATES OF INFORMATION TRANSMITTED BY OPERATING KEYBOARD)

INFORMATION OF SECOND FORMAT IS TRANSMITTED CONTINUOUSLY (STATES OF INFORMATION TRANSMITTED BY OPERATING TRACKBALL)

(STATES OF INFORMATION TRANSMITTED BY OPERATING BOTH KEYBOARD AND TRACKBALL)

INFORMATION TRANSMITTING APPARATUS

BACKGROUND OF THE INVENTION

The present invention relates to an information transmitting apparatus and, more particularly, to an information transmitting apparatus for transmitting information in wireless manner between a plurality of information sending units and an information receiving unit shared by the plurality of the information sending units wherein the information selectively contains an unit identifier for determination of a type of each of information sending unit and information transmission efficiency is enhanced.

Generally, known as a typical information transmitting apparatus using wireless means is a remote controller for a television receiver for example. The remote controller is used to control the operator panel of the television receiver from a place away from it through the remote controller operator device. In the remote controller, the carrier signal is pulse-position-modulated to be put on infrared radiation and the resultant infrared remote control signal is transmitted through a light emitting diode (LED) to the television receiver. Receiving the infrared remote control signal, the television receiver decodes the pulse-position-demodulated signal to determine the information about the key operated on the remote controller to perform control operations accordingly.

Such a remote controller is generally used with the television receiver on a one to one basis. Therefore, if a infrared remote controller for controlling devices other than the television receiver, the television receiver determines a custom code (a code unique to the manufacturer of that television receiver) included in the infrared remote control signal to ignore the infrared remote control signal radiated from such a remote controller.

Recently, multimedia systems have been drawing attention in a variety of fields. In multimedia systems, moving pictures, still pictures, voices, and other data are processed in a composite manner under the control of a computer. In addition, the computer is linked with an external communications system for performing wider information processing.

In such multimedia systems, devices such as wireless keyboard and a wireless pointer, in addition to existing remote controlling devices, have already been proposed for high-speed transmitting of a variety of input information on infrared radiation and the like.

Because it is necessary for a conventional remote controller to be made correspond to a television receiver on a one to one basis as mentioned above, a variety of information coming from a plurality of remote controllers cannot be transmitted selectively to a common television receiver, thereby making it impossible for the conventional remote controller to be universally available as an input device for multimedia systems.

In addition, in known multimedia systems, when transmitting input information from the above-mentioned proposed information input devices such as wireless keyboards and wireless pointers to the host controller, if the signal format for the remote control signal used in a known infrared remote controller is used without change, the information cannot be transmitted at high speeds. This requires to develop a new signal format suitable for the transmission of the input information from the wireless keyboards or wireless pointers.

Quite recently, though, a new infrared signal transmission standard, namely a high-speed bidirectional infrared signal transmission system, has been proposed by IrDA (Infrared Data Association) and others. Use of the infrared signal transmission system based on this proposition allows determination of send-receive devices and high-speed information transmission.

However, the above-mentioned bidirectional infrared signal transmission system requires to provide signal send-receive means on each of the equipment units between which signals are transmitted. In addition, this system requires both the equipment units to be formed by precision circuits using costly components because narrow pulses are used for information transmission. Further, because the reach of infrared is shorter than that of the conventional infrared remote controllers, the proposed system is unavailable for multimedia systems that contain television receivers.

SUMMARY OF THE INVENTION

It is therefore an object of the present invention to provide, by overcoming all of the above-mentioned problems, an information transmitting apparatus for efficiently sending input information of a plurality of transmitters to a receiver in which the types of the transmitters are determined and for matching the related-art apparatuses in signal reaching distance.

In carrying out the invention and according to one aspect thereof, there is provided an information transmitting apparatus comprising a plurality of transmitters for sending input information in wireless manner, a receiver for receiving the input information coming from the plurality of transmitters to process the received input information, and a host controller connected to the receiver for accepting the processed information from the receiver, wherein the plurality of transmitters selectively send first-format information containing no device identifier and second-format information containing a device identifier and the receiver determines a type of one of the transmitters that has sent the input information from the device identifier contained in the received second-format information to perform information processing according to the determined type of the transmitter.

According to the above-mentioned novel setup, the plurality of transmitters temporally combines the first-format information containing no device identifier and having a higher information transfer rate than that of the second-format information and the second-format information containing a device identifier and having a lower information transfer rate than that of the first-format information, the resultant combined information being sent to the receiver. The receiver determines the type of the source transmitter based on the identifier contained in the second-format information and receives a variety of data coming at the higher transfer rate by the first-format information to perform processing according to the transmitter type on the variety of data, the processed data being supplied to the host controller. Consequently, the novel setup can make the most of the advantage of the high information transfer rate by the first-format information while determining the type of the source transmitter without trouble by the device identifier contained in the second-format information.

Further, according to the novel setup, the plurality of transmitters and the receiver can each be constituted by general-purpose components used in conventional remote controllers, thereby reducing fabrication cost and making the wireless signals sent from the plurality of transmitters match that of the conventional remote controllers in reach distance.

The above and other objects, features and advantages of the present invention will become more apparent from the accompanying drawings, in which like reference numerals are used to identify the same or similar parts in several views.

DETAILED DESCRIPTION OF PREFERRED EMBODIMENT

This invention will be described in further detail by way of example with reference to the accompanying drawings.

Figure 1:
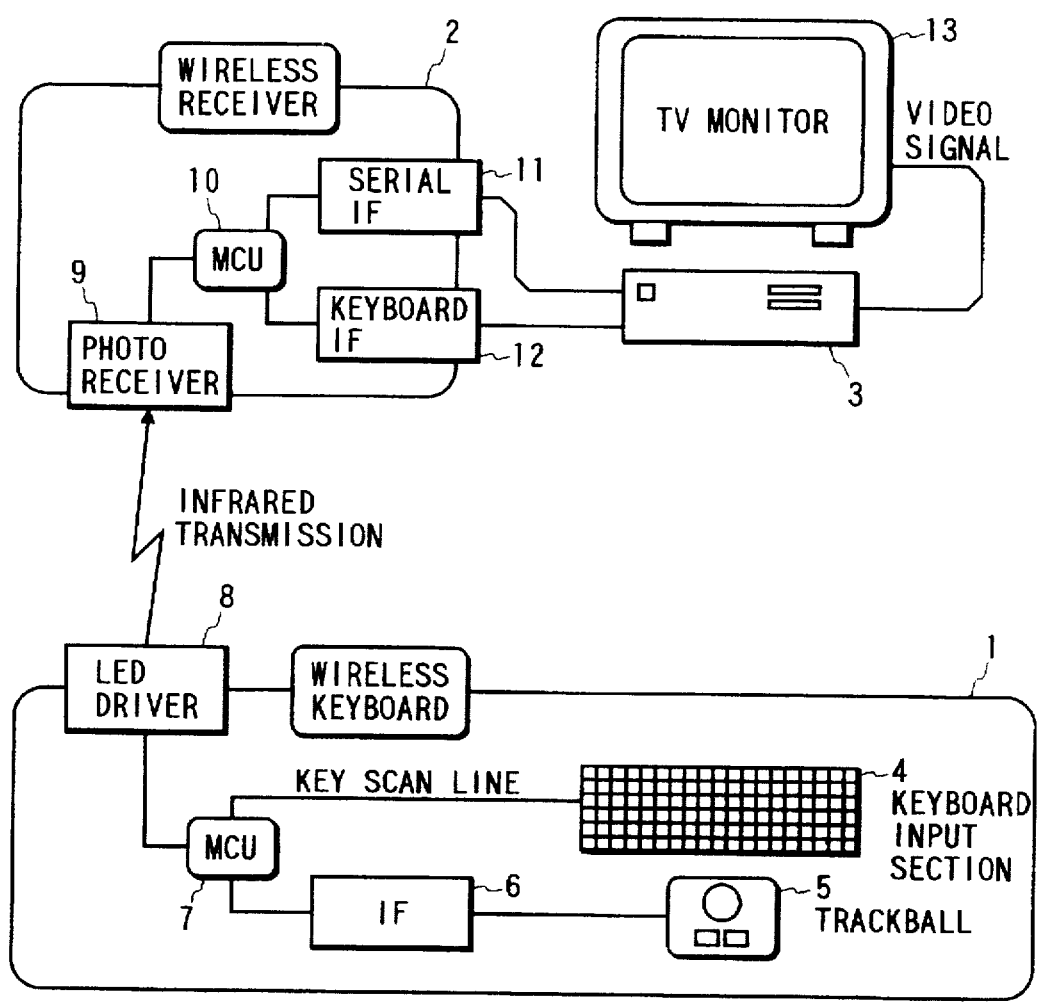
FIG. 1 is a block diagram illustrating an information transmitting apparatus practiced as one preferred embodiment of the present invention.

Now, referring to FIG. 1, there is shown a block diagram of an information transmitting apparatus practiced as one preferred embodiment of the invention. In this apparatus, a wireless keyboard having a trackball-type pointing device is used for a transmitter and a sender based on infrared signal is used for wireless signal sending means.

As shown in FIG. 1, the embodied information transmitting apparatus comprises a wireless keyboard (a sender) 1 having a trackball pointing device, an infrared receiver 2, and a host computer (controller) 3. The wireless keyboard of the present embodiment has a keyboard input section 4, a trackball 5, an interface (IF) 6, a microprocessor unit (MPU) 7, and infrared light emitting diode (LED) driver 8. The keyboard input section 4 is connected to the microprocessor unit 7 via a key scan line. The trackball 5 is connected to the microprocessor unit 7 via the interface 6. The microprocessor unit 7 is connected to the infrared LED driver 8. The wireless receiver 2 has an infrared photo receiver 9, a microprocessor unit (MPU) 10, a serial interface (IF) 11, and a keyboard interface (IF) 12. The infrared photo receiver 9 is connected to the microprocessor unit 10. The microprocessor unit 10 is connected to the serial interface 11 and the keyboard interface 12. The host computer 3 is connected to the serial interface 11 and the keyboard interface 12 via connection cables and to a television monitor 13 via another connection cable.

Generally, the above-mentioned information transmitting apparatus operate as follows.

First, in the wireless keyboard 1, when any of the keys on the keyboard input section 4 is operated, the keyboard input section 4 generates information (a make code) indicating the pressing of the key and information (a break code) indicating the releasing of the key. When the trackball 5 is operated, the trackball 5 generates count information (pointing information) indicating a cursor movement and switch operation information indicating the state of a click switch, not shown, of the trackball. The microprocessor unit 7 receives the pointing information and the switch operation information coming from the trackball 5 via the interface 6, performs a key scan operation to scan the operation state of the keyboard input section 4, and controls the infrared LED driver 8 to send the information coming from the keyboard input section 4 and the trackball 5 out of an infrared LED, not shown, in an infrared signal in wireless manner. The information to be carried on the infrared signal is a signal obtained by pulse-width modulating a carrier having a frequency of 40 kHz for example by binary information ("0" and "1") such that the duration of high level and the duration of low level are in the ratio of 1 to 2, which is called 1-2 modulating. Use of the 1-2 modulating enhances the information transfer efficiency per unit time more than double the known remote control signal.

Then, in the infrared receiver 2, the infrared photo receiver 9 receives an infrared signal coming from the wireless keyboard 1 in wireless manner and demodulates the received signal to send obtained key code information, pointing information, and switch operation information together to the microprocessor unit 10. The microprocessor unit 10 divides the received variety of information into the key code information, the pointing information, and the switch operation information and performed required processing on each of these pieces of information. The microprocessor unit 10 then supplies the processed key code information to the host computer 3 and the processed pointing information and switch operation information to the host computer 3 via the serial interface 11.

Receiving the key code information, the host computer 3 supplies a video signal corresponding to the contents of the information to display a corresponding image on the television monitor 13. Receiving the pointing information and the switch operation information, the host computer supplies a video signal corresponding to the contents of these pieces of information to the television monitor 13 to display a corresponding image thereon.

Figure 2A:
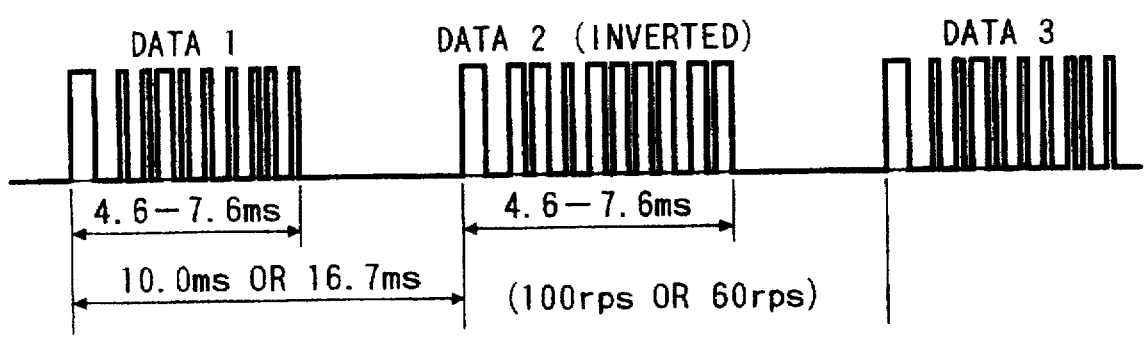
FIGS. 2 (A) and (B) show examples of states of transmission of infrared signal information for use in the embodiment of FIG. 1.
Figure 2B:
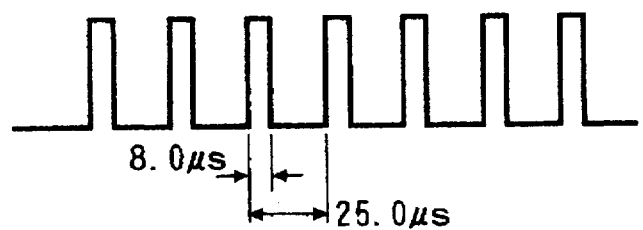

Referring to FIGS. 2 (A) and 2 (B), there are shown examples of the transmission states of the infrared signal information used in the present embodiment. FIG. 2 (A) shows signal waveforms indicating temporal transition of each information, while FIG. 2 (B) shows a carrier signal waveform.

An infrared signal is sent from the wireless keyboard 1 in wireless manner such that one piece of information data (data 1) is first sent, followed by inverted information data (data 2) obtained by inverting codes other than a leader code in the data 1, followed by another piece of information data (data 3), followed by inverted information data, not shown, obtained by inverting codes other than a leader code in the data 3, and so on. Thus, the infrared signal is constituted by a string of a piece of information data, an inverted piece of the preceding information data, still another piece of information data, an inverted piece of the preceding information data, and so on. These pieces of information data are carried by a carrier signal of FIG. 2 (B), which is modulated in the 1-2 modulating as mentioned before.

FIGS. 3 (A) through 3 (D) show signal waveforms indicating the two formats of information of FIG. 2 (A). FIG. 3 (A) shows a signal waveform of the information of the first format. FIG. 3 (B) shows a signal waveform of the information of the second format. FIG. 3 (C) shows a signal waveform indicating details of the vicinity of the leader code in the first-format information. FIG. 3 (D) shows a signal waveform indicating details of the vicinity of the leader code in the second-format information.

In FIGS. 3 (A) and 3 (B), Rev is a reverse bit, PR1, PR2 are parity bits, SW1, SW2 are switch bits, X0 through X5 are X-axis coordinate bits, Y0 through Y5 are Y-axis coordinate bits, C0 through C7 are key codes or control codes, and ID0 through ID3 are device identifier (device ID) codes. These codes or bits are either binary code 0 or binary code 1.

Figure 3A:
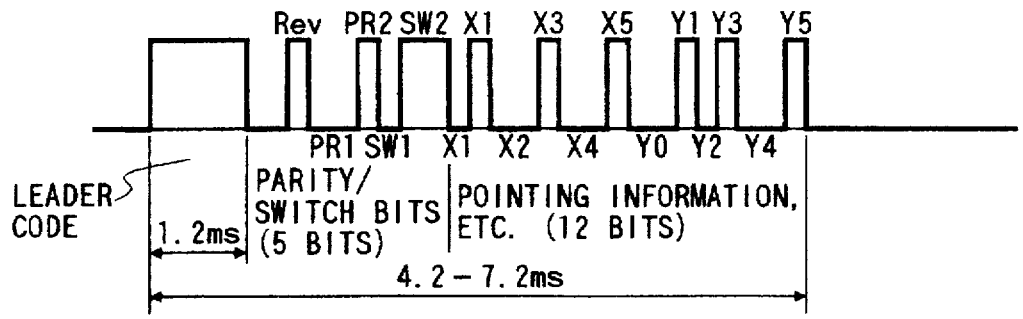
FIGS. 3 (A) through (D) are diagrams illustrating waveforms indicating formats of two types of information in the infrared signal information of FIG. 2.
Figure 3B:
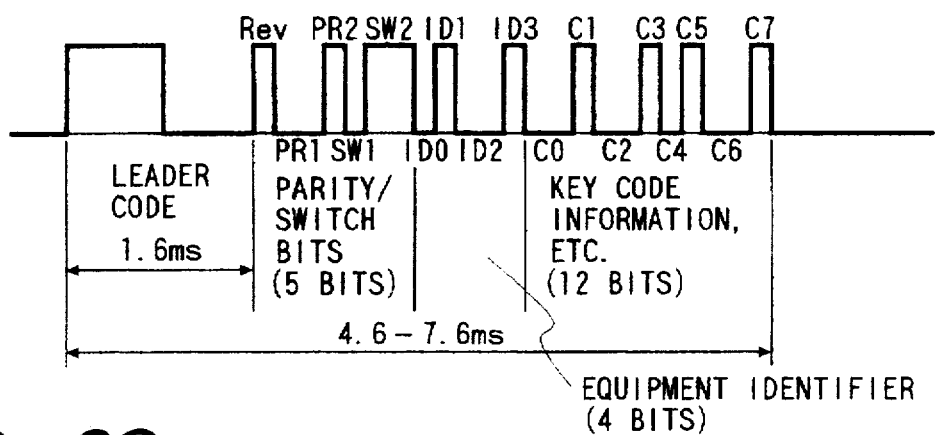
Figure 3C:
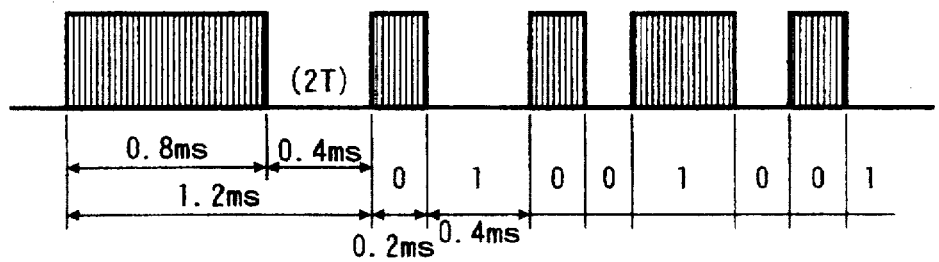
Figure 3D:
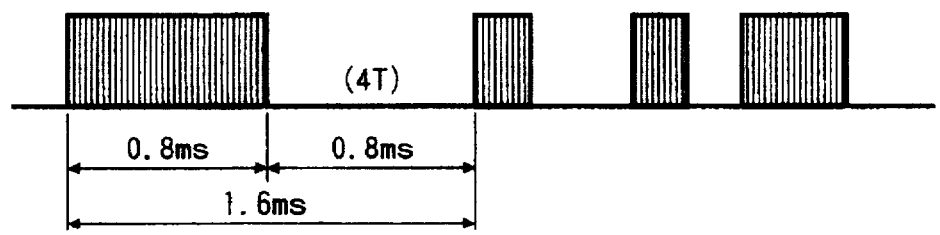

As shown in FIG. 3A, the first-format information is constituted such that first comes a leader code composed of high-level duration 4T and low-level duration 2T, followed by a reverse bit (Rev), followed by parity bits (PR1 and PR2), followed by switch bits (SW1 and SW2), followed by X-axis coordinate bits (X0 through X5), lastly followed by Y-axis coordinate bits (Y0 through Y5). The first-format information consists of 17 bits preceded by the reverse bit (Rev), five bits of which are used by the reverse bits, the parity bits (PR1 and PR2), and the switch bits (SW1 and SW2). The remaining 12 bits are used by the X-axis coordinate bits (X0 through X5) and the Y-axis coordinate bits (Y0 through Y5). On the other hand, the second-format information is constituted such that first comes a leader code composed of high-level duration 4T and low-level duration 4T, followed by a reverse bit (Rev), followed by switch bits (SW1 and SW2), followed by device identifier codes (ID0 through ID3), lastly followed by key codes or control codes (C0 through C7). The second-format information consists of 17 bits preceded by the reverse bit (Rev), 5 bits of which are used by the reverse bit (Rev), the parity bits (PR1 and PR2), and the switch bits (SW1 and SW2), four bits are used by the device identifiers, and eight bits are used by the key codes or control codes (C0 through C7).

Figure 4A:
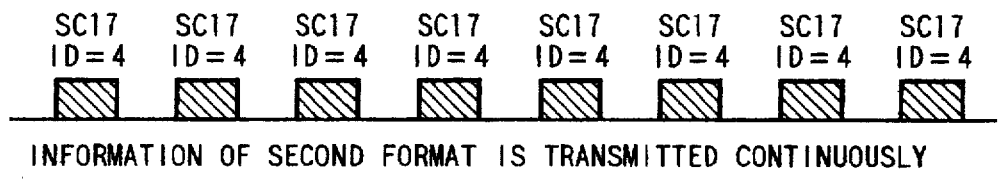
FIGS. 4 (A) through (C) show examples of the distribution states of transmission of the first-format and/or second-format information.
Figure 4B:
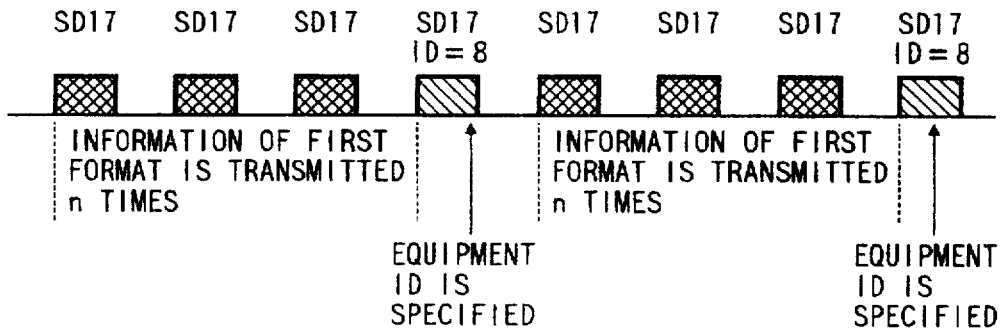
Figure 4C:
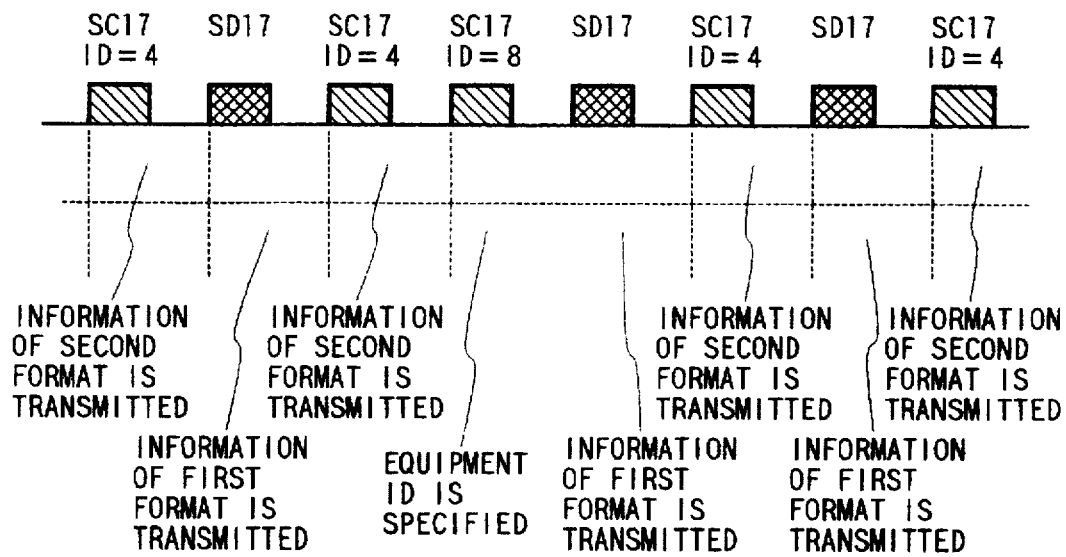

Now, referring to FIGS. 4 (A) through 4 (C), there are shown examples of distribution states of the first-format and/or second-format information sent from the wireless keyboard 1. FIG. 4 (A) shows an information transmission form in which the keyboard input section 4 has been operated. FIG. 4 (B) shows an information transmission form in which only the trackball 5 has been operated. FIG. 4 (C) shows an information transmission form in which both the keyboard input 4 and the trackball 5 have been operated.

In the present embodiment, when the keyboard input section 4 has been operated, the key code information to be outputted from the keyboard input section 4 consists of information (a make code) indicating that a key has been pressed and information (a break code) indicating that the key has been released. Therefore, one byte is enough for the information amount for that indication. The key code information is transmitted by the second-format information containing device identifiers. When the key code information is transmitted, the information of the second format (SC17 in FIG. 4) having the key code information is continuously transmitted as shown in FIG. 4 (A). At the same time, the device identifiers (ID=4 in FIG. 4) of the keyboard input section are transmitted.

When the trackball 5 has been operated in the present embodiment, the pointing information and the switch operation information to be outputted from the trackball 5 consist of a cursor movement and a click switch operation state, so that only one byte is not enough for the indication. Therefore, the pointing information and the switch operation information are transmitted by the first-format information containing no device identifier. When the pointing information and the switch operation information are transmitted, the first-format information (SD17 in FIG. 4) having the pointing information and the switch operation information is transmitted a plurality of times (n times) followed by the device identifier (ID=8 in FIG. 4) of the trackball 5 as shown in FIG. 4 (B).

Therefore, the second-format information (SC17) having the device identifier (ID=8) and the control code (eight bits) instead of the key code information is transmitted only once, again followed by the first-format information (SD17) having the pointing information and the switch operation information transmitted a plurality of times (n times) continuously.

When both the keyboard input section 4 and the trackball 5 have been operated in the present embodiment, the key code information to be outputted from the keyboard input section 4 uses the second-format information (SC17) containing the device identifier (ID=4) and the pointing information and the switch operation information to be outputted from the trackball 5 use the first-format information (SD17) containing no device identifier (ID=8). Referring to FIG. 4 (C), when these pieces of information are transmitted, the second-format information (SC17) having the key code information and the device identifier (ID=4) and the first-format information (SD17) having the pointing information and the switch operation information are transmitted a plurality of times (m times) alternately, followed by the second-format information (SC17) containing the device identifier (ID=8) and the control code (eight bits) instead of the key code information transmitted only once, and again followed by alternate transmission of the second-format information (SC17) and the first-format information (SD17) transmitted a plurality of times (m times).

For the above-mentioned information transmitting form in which both the keyboard input section 4 and the trackball 5 have been operated, a transmission priority may be given to either the second-format information (SC17) having the key code information outputted from the keyboard input section 4 or the first-format information (SD17) having the pointing information and the switch operation information outputted from the trackball 5. However, the alternate transmission of the second-format information (SC17) and the first-format information (SD17) as shown in FIG. 4 (C) allows the simultaneous operation of both the keyboard input section 4 and the trackball 5.

The following tables show the first-format information of FIG. 3 (A), the second-format information of FIG. 3 (B), and code definitions of the reverse bit (Rev), the parity bits (PR1 and PR2) and the switch bits (SW1 and SW2).

TABLE 1

| | The first-format information | | | | | | | | |
|---|---|---|---|---|---|---|---|---|---|
| | 0 | 1 | 2 | 3 | 4 | 5 | 6 | 7 | 8 |
| Low level | 2T | PR1 | SW1 | X0 | X2 | X4 | Y0 | Y2 | Y4 |
| High level | Rev | PR2 | SW2 | X1 | X3 | X5 | Y1 | Y3 | Y5 |

TABLE 2

| | The second-format information | | | | | | | | |
|---|---|---|---|---|---|---|---|---|---|
| | 0 | 1 | 2 | 3 | 4 | 5 | 6 | 7 | 8 |
| Low level | 4T | PR1 | SW1 | ID0 | ID2 | C0 | C2 | C4 | C6 |
| High level | Rev | PR2 | SW2 | ID1 | ID3 | C1 | C3 | C5 | C7 |

TABLE 3

| | Definitions of symbols (Rev, PR1, PR2, SW1, SW2) | | | | |
|---|---|---|---|---|---|
| Rev | Definition | PR1 (2) | Definition | SW1 (2) | Definition |
| 0 | Code sent without change | 0 | Even number of bits 1 | 0 | Key switch not operated |
| 1 | Code sent inverted | 1 | Odd number of bits 1 | 1 | Key switch operated |

Referring to Table 1 above, the reverse bit (Rev) is "0" when the code is transmitted without polarity change as with the data 1 and data 3 of FIG. 2 (A). When the code is transmitted with its polarity inverted as with the data 2 of FIG. 2 (A), the bit code goes "1". Each of the parity bits (PR1 and PR2) goes "0" when the number of bits is odd and "1" when the number of bits is even. Each of the switch bits (SW1 and SW2) goes "0" when no switch (or key) has been operated and "1" when a switch (or a key) has been operated.

Meanwhile, when the first-format information and/or the second-format information is sent to the infrared photo receiver 2, the infrared photo receiver 2 determines the format of the received information, recognizes the type of transmitter from which the information has been sent, and performs information processing according to the type of the transmitter.

Figure 5:
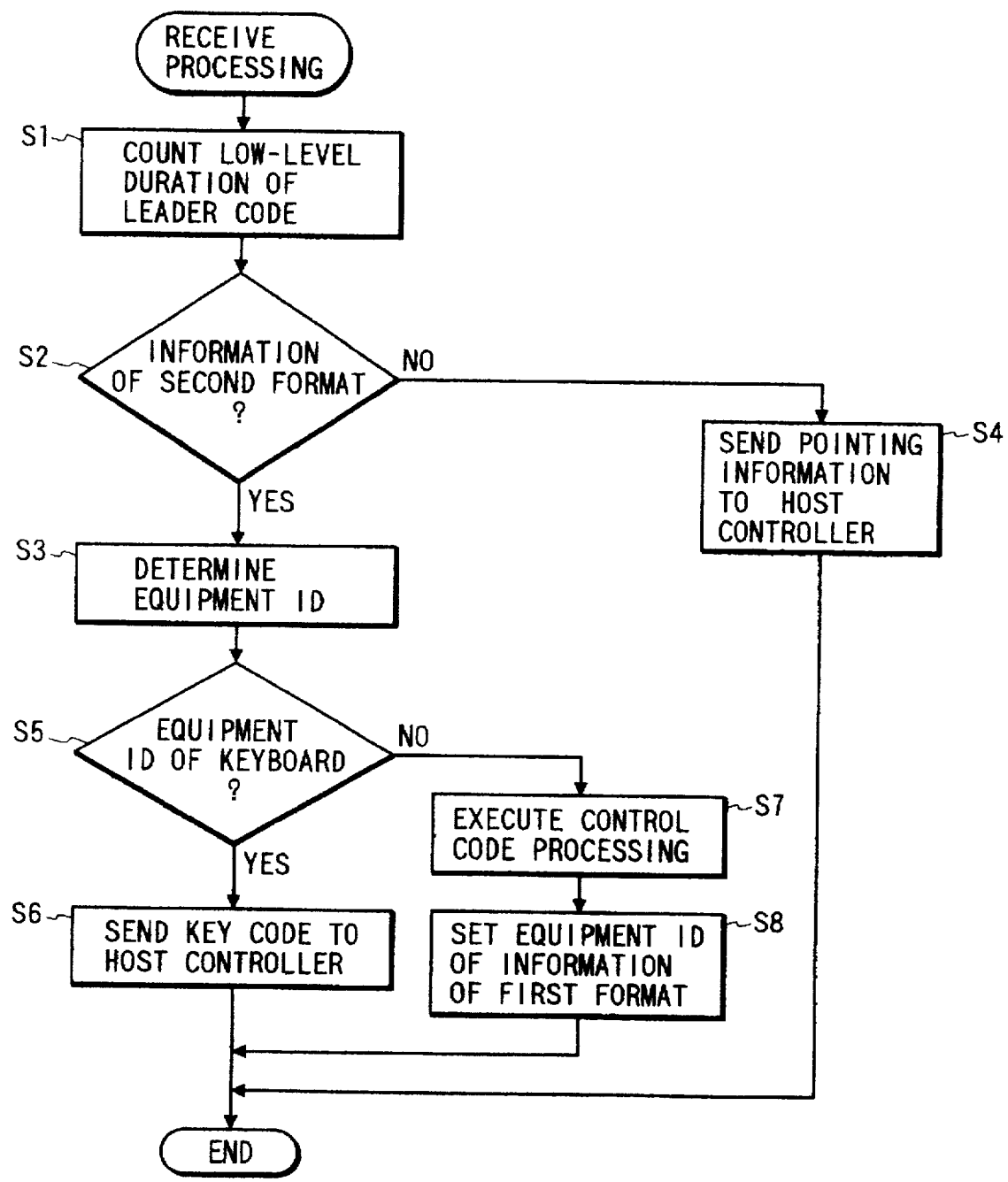
FIG. 5 is a flowchart describing the information processing by a microprocessor unit of an infrared receiver.

FIG. 5 shows a flowchart describing the format determination, the recognition of the transmitter type, and the information processing according to the type to be performed by the microprocessor unit 10 of the infrared photo receiver 2.

The above-mentioned operations are performed in the following steps:

First, the low-level duration of the leader code contained in the transmitted information is measured in step 1.

Next, it is determined, in step 2, from the measured low-level duration whether the transmitted information is of the second format or not. If the transmitted information has been found of the second format (Y), the processing goes to step 3; if the transmitted information has been found not of the second format (N) (namely, it has been found of the first format), the processing goes to step 4.

In step 3, the type of the transmitter is recognized from the device identifier contained on the second-format information.

In step 4, the pointing information is extracted from the first-format information. The extracted pointing information is supplied to the host computer 3 via the serial interface 11, upon which the processing on this transmitted information ends.

In step 5, it is determined whether the device identifier contained in the second-format information is of the keyboard input section 4 or not. If the identifier has been found of the keyboard input section 4 (Y), the processing goes to step 6; if not (N), the processing goes to step 7.

In step 6, the key code information is extracted from the second-format information and the extracted key code is supplied to the host computer 3 via the keyboard interface 12, upon which the processing on this transmitted information ends.

In step 7, the device identifier in the second-format information is processed by the control code.

In step 8, the device information processed by the control code is set to a virtual device identifier, upon which the processing on this transmitted information ends.

Thus, according to the present embodiment, the information from a transmitter having relatively small amount of information such as the keyboard input section 4 is transmitted by the second-format information containing the device identifier and the information from a transmitter having a relatively large amount of information such as the trackball 5 is transmitted by the first-format information having relatively high information transfer rate, thereby allowing the transmission of necessary information at the relatively high transfer rate. In addition, since it is not especially necessary for the first-format information and the second-format information to be formed by narrow pulses, the circuits of both the transmitting and receiving devices can be formed by the similar general-purpose components as those used in conventional remote controllers, resulting in reduced fabrication cost. This novel constitution also allows the infrared signal to reach generally the same distance as that with conventional remote controllers.

Further, according to the present embodiment, on the receiver side, the information format is determined from the information forms the first-format information and the second-format information and the type of the transmitter is recognized by the device identifier contained in the determined second-format information, thereby allowing the information processing based on the recognition.

In the above-mentioned embodiment, the wireless keyboard having the trackball is used for example as the transmitter. It will be apparent to those skilled in the art that the present invention is also applicable to a wireless pointing device, a wireless game pad, and a space pointer for example.

In the above-mentioned embodiment, wireless transmitting means based on infrared signals are described by way of example as the wireless means. It will be apparent to those skilled in the art that the wireless means for use in the present invention are not limited to infrared wireless means; wireless means based on radio signals may also be used.

In the above-mentioned embodiment, the device identifier for the keyboard input section 4 is set to ID=4 and the device identifier for the trackball 5 is set to ID=8. It will also apparent to those skilled in the art that these settings are examples; therefore the device identifiers may be set to any of ID=0 through ID=15 for example.

As described and according to the present invention, the plurality of transmitters 1 temporally combines the first-format information containing no device identifier and having a higher information transfer rate than that of the second-format information and the second-format information containing a device identifier and having a lower information transfer rate than that of the first-format information, the resultant combined information being sent to the receiver 2. The receiver 2 determines the type of the source transmitter based on the identifier contained in the second-format information and receives a variety of data coming at the higher transfer rate by the first-format information to perform processing according to the transmitter type on the variety of data, the processed data being supplied to the host controller 3. Consequently, the novel setup can make the most of the advantage of the high information transfer rate by the first-format information while determining the type of the source transmitter without trouble by the device identifier contained in the second-format information.

Further, according to the present invention, the plurality of transmitters 1 and the receiver 2 can each be constituted by general-purpose components used in conventional remote controllers, thereby reducing fabrication cost and making the wireless signals sent from the plurality of transmitters 1 match that of the conventional remote controllers in reach distance.

While the preferred embodiment of the present invention has been described using specific terms, such description is for illustrative purposes only, and it is to be understood that changes and variations may be made without departing from the spirit or scope of the appended claims.

What is claimed is:

1. An information transmitting apparatus comprising:

plurality of transmitting means for sending input information by wireless means;

receiving means for receiving said input information coming from said plurality of transmitting means to process the received input information; and host controlling means connected to said receiving means for accepting the processed information from said receiving means;

wherein said plurality of transmitting means selectively send first-format information containing no device identifier and second-format information containing a device identifier and said receiving means determines a type of one of said plurality of transmitting means that has sent said input information from said device identifier contained in the received second-format information to perform information processing according to the determined type of one of said plurality of transmitting means.

2. An information transmitting apparatus according to claim 1, wherein said first-format information and said second-format information each comprises a leader code followed by a data code and a low-level duration of said leader code of said first-format information is a half of said second-format information.

3. An information transmitting apparatus according to claim 1, wherein said wireless means is transmitting means based on infrared radiation.

4. An information transmitting apparatus according to claim 1, wherein each of said plurality of transmitting means is a keyboard having a trackball-type pointing device.

5. An information transmitting apparatus according to claim 1, wherein said host controlling means is a personal computer.

* * * * *